Patented May 2, 1944

2,347,723

UNITED STATES PATENT OFFICE 2,347,723

TROPIC ACID AMIDE AND MANUFACTURE THEREOF

Wilhelm Wenner, Montclair, N. J., assignor to Hoffmann-La Roche, Inc., Nutley, N. J., a corporation of New Jersey No Drawing. Original application June 26, 1939, Serial No. 281,269. Divided and this application October 14, 1942, Serial No. 462,064. In Germany July 7, 1938

4 Claims. (Cl. 260—247)

The need for an effective choleretic has become more and more evident in recent years since it has been established that by increasing the secretion of bile, illnesses of the liver and bile ducts can be favourably influenced. A number of cholagogic preparations have in fact already been placed on the market. The better known among them contain as active substances bile acid derivatives, podophyllin, as well as extracts from plants (e. g. radish extract). Extracts from liver and gall bladder have also been employed as choleretics.

It has now been found that tropic acid amide and its neutral N-substituted derivatives possess a strong cholagogic action.

Only tropic acid amide has been described in the literature up to the present (Annalen der Chemie, vol. 389, year 1912, page 111). This was obtained through the following intermediate stages: Tropic acid, atropic acid, β-bromo-α-phenyl propionic acid. The manufacture of atropic acid as well as of β-bromo-α-phenyl propionic acid does not proceed satisfactorily because the formation of by-products cannot be avoided (Annalen der Chemie, vol. 209, year 1881, page 12, paragraph 4). Likewise, the transformation of β-bromo-α-phenyl propionic acid into tropic acid amide can only be carried out in poor yield, since atropic acid as well as atrolactic acid and styrol occur as by-products (Annalen der Chemie, vol 115, year 1860, page 159; vol. 209, year 1881, page 11). This process cannot therefore be taken into consideration for the technical synthesis of tropic acide amide.

The disadvantages described can be avoided if tropic acid amide is obtained by allowing ammonia to act on o-acetyl tropic acid chloride. The ammonia may be employed in aqueous solution or in a suitable organic solvent, such as benzene, toluene, ether, chloroform, petroleum ether. o-Acetyl tropic acid amide is obtained in very good yield. By treating this compound with acids or alkalis under suitable conditions, the acetyl group is split off.

If amines, e. g., piperidine and its C-substitution derivatives are caused to act on o-acetyl tropic acid chloride in the same manner, the corresponding substituted amides of o-acetyl tropic acid are obtained. The amines employed are also best used in solution in water or in an organic solvent. The acetyl group is split off by treatment with alkalis or acids from the resulting o-acetyl tropic acid amides substituted in the amido group.

Tropic acid amide and its neutral N-substituted derivatives are colourless compounds. The lower members of the series are crystalline, the higher members mostly liquids. They are to be employed as choleretics. The examination of the cholagogic action was carried out in accordance with Grabe's process (Archiv für experimentelle Pathologie und Pharmakologie, vol. 176, year 1934, page 673). According to this method the gall secretion in the narcotised rat is first determined over a period of 2 hours, the preparation to be examined then administered by means of a stomach tube, and the ensuing change in the gall secretion observed.

Example 1

45 parts by weight of o-acetyl tropic acid chloride are added dropwise to a solution of 40 parts by weight of piperidine in 200 parts by weight of benzene while stirring and cooling. The reaction mixture is extracted with water and evaporated to dryness. o-Acetyl tropic acid piperidide of melting point 83° C. is obtained. By saponification with aqueous alcoholic alkali, tropic acid piperidide of melting point 102° C. is obtained in a yield of 80 per cent.

Example 2

20 parts by weight of tropic acid are transformed into o-acetyl tropic acid chloride in the usual manner. The o-acetyl tropic acid chloride is dissolved in 100 parts by weight of benzene and the solution added dropwise to a cooled solution of 22 parts by weight of morpholine in 100 parts by weight of benzene while stirring. The mixture is left to stand overnight. It is then extracted with water and dilute hydrochloric acid. The benzene solution is evaporated. The remaining oil is dissolved in 100 parts by weight of alcohol. 36 parts by weight of a 10 per cent solution of caustic soda are added dropwise to the solution while stirring and keeping at moderate temperature. After 2 hours the reaction mixture is acidified and evaporated to dryness. The residue is extracted with boiling benzene. On cooling, tropic acid morpholide crystallises from the concentrated benzene extract. By recrystallisation from benzene petroleum-ether, the compound is obtained in colourless needles melting at 91° C. The yield amounts to about 18 parts by weight.

This application is a division of my application Serial No. 281,269 filed June 26, 1939.

What I claim is:

1. A derivative of tropic acid amide of the formula:

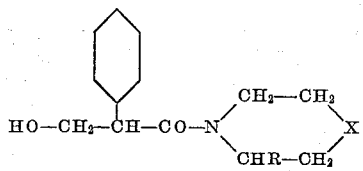

wherein X is selected from the group consisting of a methylene group and oxygen and R is selected from group consisting of hydrogen or a lower alkyl radical.

2. A tropic acid amides derivative selected from the group consisting of tropic acid piperidide, tropic acid lower alkyl piperidide and tropic acid morpholide.

3. Tropic acid piperidide.

4. Tropic acid morpholide.

WILHELM WENNER.